H. J. STOCKUM.
DISK MARKER FOR AGRICULTURAL PURPOSES.
APPLICATION FILED JULY 25, 1913.

1,126,118.

Patented Jan. 26, 1915.
2 SHEETS—SHEET 1.

H. J. STOCKUM.
DISK MARKER FOR AGRICULTURAL PURPOSES.
APPLICATION FILED JULY 25, 1913.
1,126,118.
Patented Jan. 26, 1915.
2 SHEETS—SHEET 2.
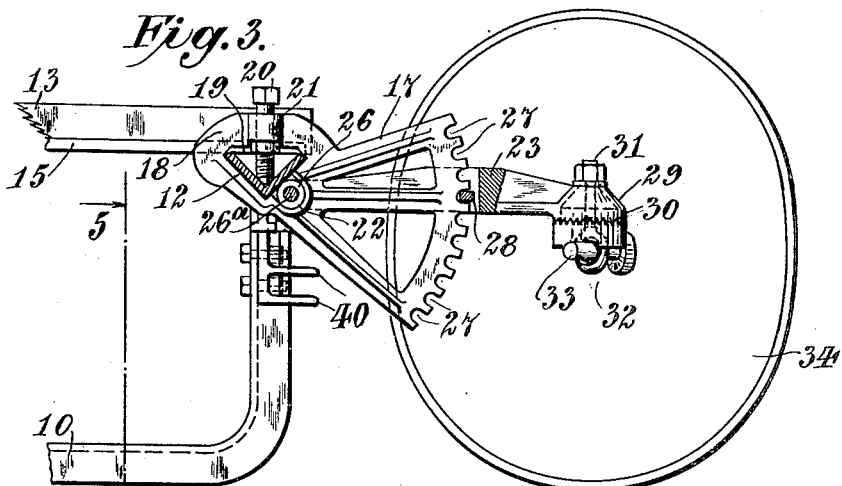
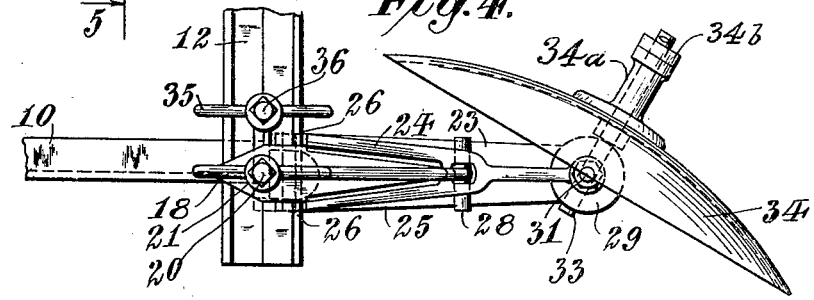
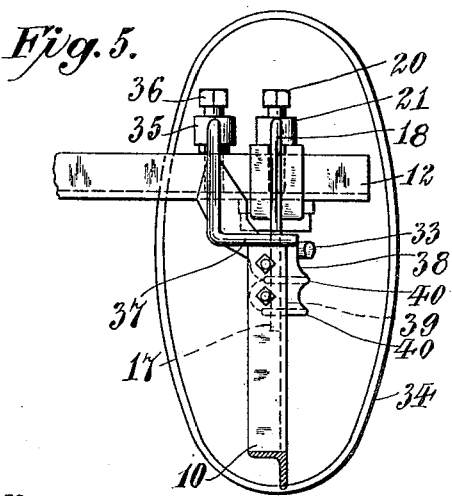
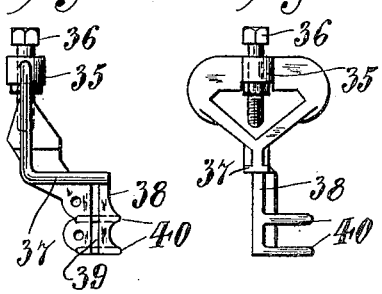
Henry J. Stockum, INVENTOR.
BY Kerr, Page, Cooper & Hayward,
his ATTORNEYS.

UNITED STATES PATENT OFFICE.

HENRY J. STOCKUM, OF NEW YORK, N. Y.

DISK MARKER FOR AGRICULTURAL PURPOSES.

1,126,118.  Specification of Letters Patent.  Patented Jan. 26, 1915.

Application filed July 25, 1913. Serial No. 781,073.

*To all whom it may concern:*

Be it known that I, HENRY J. STOCKUM, a citizen of the United States, residing at New York, county of New York, and State of New York, have invented certain new and useful Improvements in Disk Markers for Agricultural Purposes, of which the following is a full, clear, and exact description.

This invention relates to agricultural machinery, more particularly to an implement usually known as a "marker."

One object of the invention is to provide an implement of this character with means whereby the width, depth and distance between the furrows may be readily adjusted.

Another object is to provide means whereby the disks are supported independent of the runners, and thereby rendered easy of adjustment, and at the same time have them supported directly in line with the runners, so that extra deep furrows may be made by allowing the runners to move in the bottom of the furrows already made, the disks cutting below the bottom of the first furrows; and also to obtain a straight, direct draft.

The various other objects and advantages will more fully appear from the detailed description and the novel features will be particularly pointed out in the claims.

Figure 1:
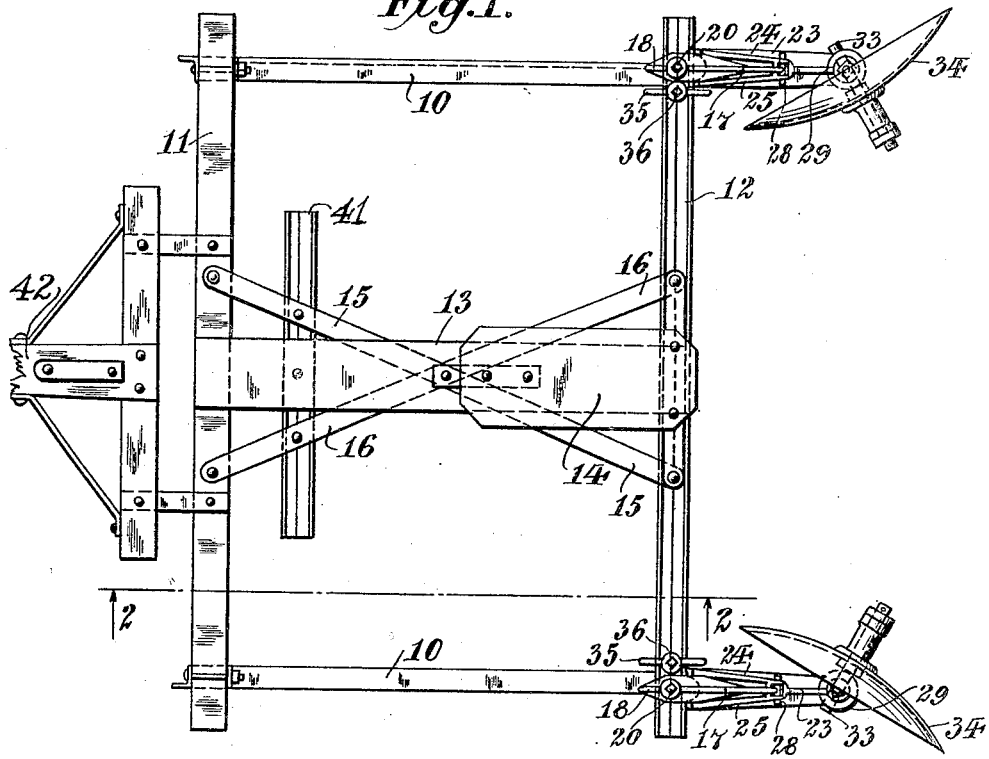
Figure 2:
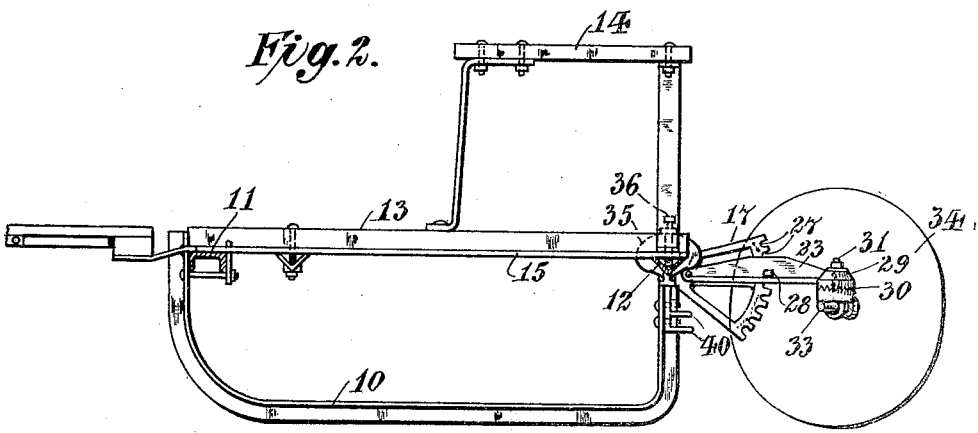

In the drawing illustrating this invention, Figure 1 is a plan view of a marker embodying my invention. Fig. 2 is a section taken along line 2—2 of Fig. 1. Fig. 3 is an elevational detail view on an enlarged scale illustrating the mode of connection and adjustment of the disk. Fig. 4 is a plan view of the construction illustrated in Fig. 3. Fig. 5 is a section taken along line 5—5 of Fig. 3. Fig. 6 is a rear elevational view and Fig. 7 is a side view illustrating in detail the hanger for the runners.

The improved implement comprises a frame mounted upon runners 10, preferably formed of angle irons or T's bent to the proper contour. The frame consists of a front cross piece 11 and a rear cross piece 12 connected by a center board 13, on which is mounted the usual seat 14 for the operator. Diagonal braces 15 and 16 unite the cross pieces and stiffen and brace the frame.

The disks employed for turning up the furrows are mounted upon the rear cross piece as follows: A segment 17 is formed with an enlargement 18 having a triangular aperture 19 through which the segment may be passed over the angle iron 12 constituting the rear cross piece. This angle iron preferably opens upward, thereby forming a channel into which may be screwed the set screw 20 passing through a boss 21 formed in the enlargement 18 and threaded to the nut 20' which is located in jaws which prevents same from turning in either direction. This arrangement enables me to obtain the set screw effect with a standard machine bolt. The segment may thus be slid along the angle iron to the desired position of adjustment and securely clamped by the set screw. The sides of the triangular apertures 19 are somewhat elongated and these elongations in combination with the set screw arrangement serve admirably to hold the segments 17, which support the disks, normally in rigid relation to all axes. At the same time a sufficient clearance is provided between said parts and the arm 12, when the set screw is released, to enable the parts to be easily and readily moved relatively to one another.

Extending from the aperture 19 in the enlargement 18 of the segment is an open bearing 22 located at the axis of the segment, and mounted in this bearing is an arm 23 having two prongs 24 and 25 which straddle the same. These prongs are formed at their extremities with inwardly extending bosses 26 which form trunnions upon which the arm 23 is mounted in the bearing. A bolt or pin 26$^a$ may extend through the trunnions to firmly hold the prongs together and maintain the bosses within the bearing. The face of the segment may be formed with notches 27 which are engaged by a pin 28 inserted through apertures in the prongs 24 and 25 to hold the arm in any desired position of vertical adjustment upon the segment. The outer end of the arm 23 is formed with a boss 29 having upon its lower face the serrations 30, against which is clamped by an eye-bolt 31, in a corresponding groove 32, the stub shaft 33 which carries the disk 34. It will be seen that by unscrewing the eye-bolt 31, the disk may be adjusted to any desired angle about vertical and horizontal axes. The hub 34$^a$ bears against a suitable thrust member 34$^b$ removably secured to the stub-shaft. By virtue of the eye-bolt arrangement and the removable bearing member the said shaft may be reversed and both ends be used as a bearing thereby doubling its period of usefulness. While I show the use of two disks it is very obvious that any desired number of disks may be employed.

For securing the runner to the rear cross piece, so that it will be in the line of draft of the disk, I provide a hanger 35 having a triangular aperture formed therein similar to the aperture formed in the enlargement on the segment 17 and is also similarly clamped to the cross piece by a set screw 36, or a bolt acting as a set screw, engaging within the channel or the cross piece. This hanger is formed at the bottom with an offset portion 37 having a web 38 depending therefrom and formed with a slot 39 through which the edgewise extending portion of the angle of the runner projects. The web may be formed with ribs 40 straddling the portion of the runner extending within the slot. The web may be further formed with bolt holes through which the flat portion of the runner may be attached. It will be clear that by this offset construction of the hanger, the runner may be adjusted to a position under the segment and may thus be disposed directly in the line of draft of the disk; this arrangement is also necessary for retracing and making furrows deeper than can be made by one stroke of the disks.

From the foregoing description, it will be clear that I have provided a marker which may be readily adjusted to produce a furrow of the desired width and depth and also space the furrows at proper distances from each other. Moreover, the parts may be readily and cheaply manufactured and are easily separable. By the use of the open bearing in the segment for the arm 23, the latter can be readily removed from the segment when the latter is slid off the cross piece by merely swinging the arm past the face of the segment and withdrawing the bolt or pin 26ª, as will be readily understood. The teeth of the segment are formed in the face thereof and thus they may be cast and need not be drilled as in the usual form of segment in which the arm is held by a pin passing through the apertures in the segment. The employment of a member 18 separate from the runner for supporting the disks has the further advantage of permitting the removal of the said members together with the disks, segments 17, and arms 23, after which the same may be placed upon the bar 41 without disturbing the adjustment of the runners, or without disturbing the adjustment of the disks with respect to said members.

It will be understood by those skilled in the art that where the machine is of considerable weight some provision ought to be made to facilitate its turning around in a small space without exerting undue strain on the tongue or pole 42. I have made such provision but this constitutes the subject matter of a separate application.

It will be understood that I do not limit myself to the exact construction illustrated in the accompanying drawings as many departures can be made in point of detail and other modifications resorted to without necessarily departing from the true spirit and scope of my invention.

Having thus described my invention, I claim as new and desire to secure by Letters Patent:

1. In an implement of the character described, a frame comprising a cross piece, a segment having an aperture therein adjustably mounted upon the cross piece and having a bearing opening into the aperture, an arm having a fork straddling the segment and pivoted within the open bearing, and a disk mounted upon the arm, said disk being adjustable about vertical and horizontal axes.

2. In an implement of the character described, a frame comprising an angular cross piece, a segment having an angular aperture therein adjustably mounted upon the cross piece and formed with a bearing opening into the aperture, means for clamping the segment against the cross piece, an arm having a fork straddling the segment and pivoted within the open bearing, and a disk mounted upon the arm, said disk being adjustable about vertical and horizontal axes.

3. In an implement of the character described, a frame comprising a cross piece, a segment having an aperture therein adjustably mounted upon the cross piece and formed with a bearing opening into the aperture, an arm having a fork straddling the segment and provided with inwardly extending bosses and pivoted within the open bearing, a bolt passing through the bosses, and a disk mounted upon the arm, said disk being adjustable about vertical and horizontal axes.

4. In an implement of the character described, a frame comprising a cross piece, a segment having an aperture therein adjustably mounted upon the cross piece the segment being formed with radial teeth and having a bearing opening into the aperture, an arm having a fork straddling the segment and pivoted within the open bearing, said fork being formed with perforations adjacent to the teeth of the segment, a pin passing through the perforations and engaging the teeth to hold the arm in adjusted position, and a disk mounted upon the arm, said disk being adjustable about vertical and horizontal axes.

5. In an implement of the character described, a frame comprising a cross piece, a runner, a segment mounted upon the cross piece, a member adjustable on said segment, a disk supported by said member, a hanger mounted upon the cross piece and having an offset portion extending in the direction of the segment, said runner being attached to the offset portion.

6. In an implement of the character described, a frame comprising a cross piece, an angular runner, a segment mounted upon the cross piece, a member adjustable on said segment, a disk supported by said member, a hanger mounted upon the cross piece and having an offset portion extending in the direction of the segment, said offset portion having a web formed with a slot adapted to receive the edgewise extending portion of the angular runner, ribs bridging the slot, and means for fastening the runner to the web.

7. In an implement of the character described, a frame having an angular cross piece opening upward, a segment having a triangular aperture mounted upon the cross piece, a disk adjustably supported upon said segment, a hanger also having a triangular aperture adjustably mounted upon the cross piece, set screws passing through the segment and hanger extending into the upwardly opening portion of the angle to clamp the respective parts thereto, a runner, and means for attaching the runner to the hanger.

8. In an implement of the character described, a frame, a cross piece, two or more segments upon the cross piece, disks adjustably secured to said segments, a pair of runners, hangers mounted upon the cross piece and having offset portions extending toward the segments, and means for securing the runners to said offset portions into a position of substantial alinement with the disks.

In testimony whereof I affix my signature in the presence of two subscribing witnesses.

HENRY J. STOCKUM.

Witnesses:
    JOHN C. KERR,
    THOMAS J. BYRNE.

Copies of this patent may be obtained for five cents each, by addressing the "Commissioner of Patents, Washington, D. C."